United States Patent [19]

Haskins

[11] Patent Number: 4,491,695

[45] Date of Patent: Jan. 1, 1985

[54] MOUNTING FOR A DIAL IN A TELEPHONE SET BASE

[75] Inventor: Steve W. Haskins, Mount Juliet, Tenn.

[73] Assignee: Northern Telecom Limited, Montreal, Canada

[21] Appl. No.: 486,721

[22] Filed: Apr. 20, 1983

[51] Int. Cl.³ .................... H04M 1/23; H04M 1/02
[52] U.S. Cl. .................... 179/100 D; 179/179
[58] Field of Search .......... 179/100 D, 100 R, 146 R, 179/90 R, 179, 178; 361/346, 417, 419

[56] References Cited

U.S. PATENT DOCUMENTS 3,657,487 4/1972 Schwanck et al. ........ 179/100 D X
4,385,212 5/1983 Tyler ........................ 179/100 D X

FOREIGN PATENT DOCUMENTS 2014961 3/1970 Fed. Rep. of Germany ...... 179/178

Primary Examiner—Gene Z. Rubinson
Assistant Examiner—James L. Dwyer
Attorney, Agent, or Firm—Schwartz, Jeffery, Schwaab, Mack, Blumenthal & Koch

[57] ABSTRACT

A mounting for a dial in a telephone set comprises two sets of interengaging brackets, support brackets extending up from the bottom surface of the telephone set base and mounting brackets extending down from the dial assembly. Each support bracket has spaced guide surfaces and a latch member having a downwardly facing latch surface. Each mounting bracket has guide surfaces for cooperation with the guide surfaces on the support brackets and a recess into which a latch member can engage. At least one latch member is resiliently deflectable. The dial assembly is mounted by aligning the guide surfaces and pushing down on the dial assembly, the latch members snapping into the recesses. No access to screws or other fastenings is required. One of the support brackets can be integral with a side wall of the base.

14 Claims, 10 Drawing Figures

MOUNTING FOR A DIAL IN A TELEPHONE SET BASE

This invention relates to the mounting of a dial in a telephone set base. In particular it relates to a snap-in mounting of a dial in a low profile telephone set base. The invention also relates to the assembly of dial and telephone set base.

It is becoming increasingly difficult to mount components, such as a dial, in a telephone set with the continuous decrease in vertical height of the telephone set base, hereafter referred to as the base.

With the advent of integrated circuits and miniature components, the space necessary in a base is being continuously reduced. In many cases, the plan-form dimensions cannot be reduced, particularly for desk and wall telephones in which additional items are provided. Such items are notepads, repertory dialing buttons and similar items. Such items preset the width of a base. The length of the handset sets the dimension of the base in a direction normal to the width, i.e. from front to back or bottom to top, depending upon desk or wall mounting. It is therefore becoming a feature of telephones that the set base is reduced in height.

Hitherto, the dial has been mounted on brackets which extend up from the bottom surface of the base member. The dial is mounted on the brackets by screws which pass through downward extending brackets on the dial and which screw into holes at the top ends of the brackets extending up from the bottom surface. The screws were readily accessible as they were spaced well above the bottom of the base member and clear of any other components in the base.

With the reduction in height, it becomes extremely difficult to provide ready access to retaining screws holding a dial in place. The side wall of the base, and other components, for example, prevent direct access to the screw by a screwdriver. Thus assembly of the dial to a base, and removal of a dial from a base is difficult, and can result in damage to other parts and components.

The present invention provides a mounting for a dial in which the dial can be pushed down and is snapped into position, within a base which, at the limit, need be no higher than the thickness of the dial assembly. The dial can be mounted immediately adjacent one side wall of the base and can have other components mounted immediately adjacent to it. Positioning or mounting of the dial and removal of the dial is obtained purely by movement in a direction normal to the bottom surface of the base. This is normally a vertical movement. Mounting is by sliding the dial downward, supporting brackets on the dial engaging with and being guided by mounting brackets extending up from the bottom surface of the base. The dial is pressed down until a snap engagement occurs between cooperating pairs of brackets. Removal is by inserting a tool down between one pair of brackets to flexibly deform one of the brackets on the base and release the associated bracket on the dial. The dial can then be lifted and also tilted to disengage the other pair of brackets.

In accordance with the present invention, a mounting for a dial in a telephone set base, comprises two opposed spaced apart support brackets extending up from the bottom surface of a base member, each support bracket including a pair of spaced guide formations, a latch member positioned between the guide formations of each pair, the latch member including a forward projecting latch surface spaced from the bottom surface and an inclined surface leading down to the projecting edge of the latching surface, at least one of the latch members being resiliently deflectable, and a cooperating pair of mounting brackets extending down on each side of a dial assembly, each mounting bracket having guide formations for cooperating with the guide formations on the brackets extending up from the bottom surface and also including a recess into which a latching surface can enter. In a particular embodiment one bracket is unitary with a side wall of a telephone set base.

The invention will be readily understood by the following description of an embodiment, by way of example, in conjunction with the accompanying drawings, in which.

Figure 1:
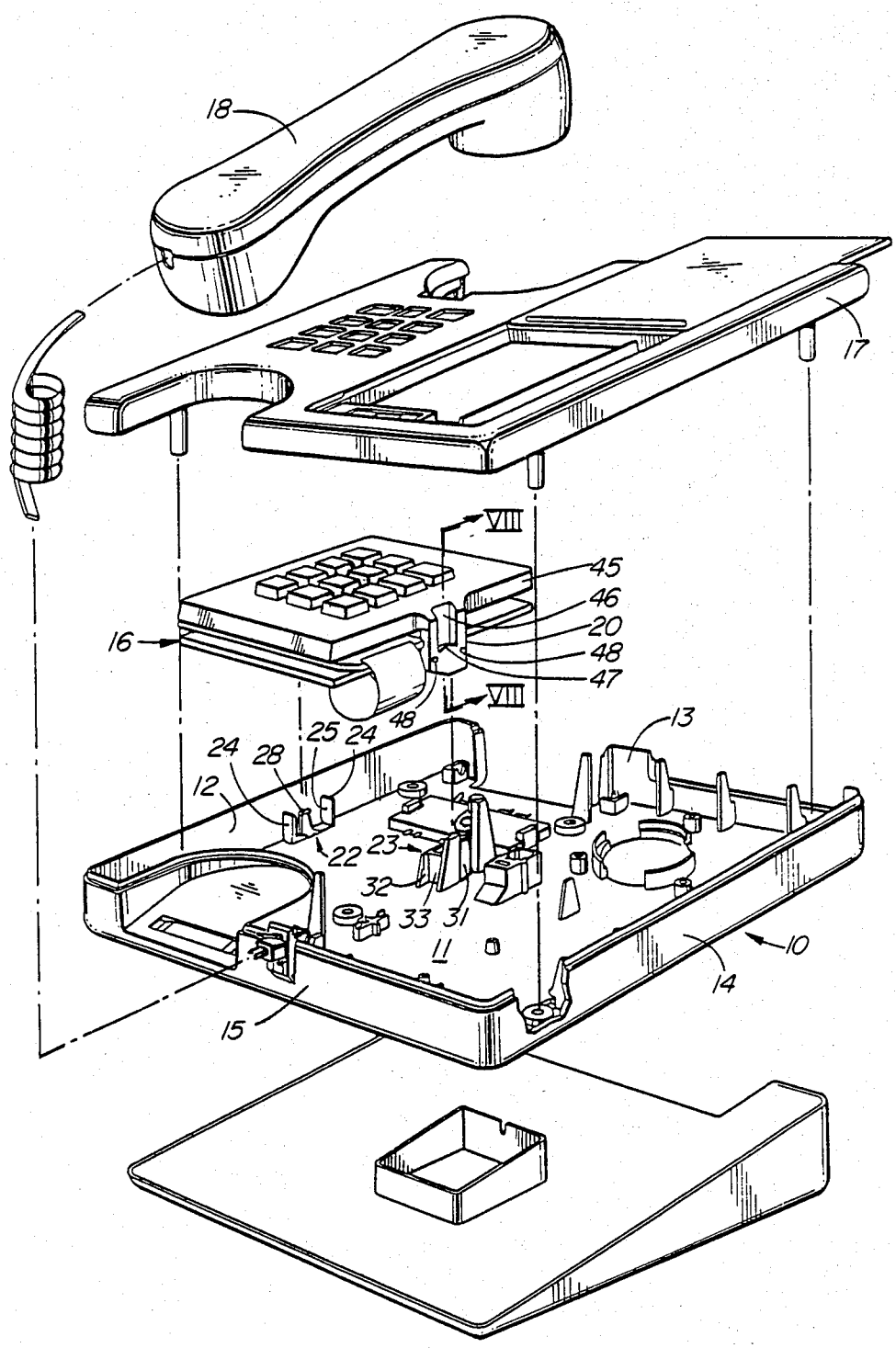
FIG. 1 is an exploded perspective view of a telephone set base and a dial assembly.

In FIG. 1, a base of a telephone set is indicated at 10, the base having a bottom surface 11 and sides 12, 13, 14 and 15. Various mounting positions are provided for various components, including a pushbutton dial assembly 16. The present invention is concerned only with the mounting of the dial and therefore the other components are not illustrated. A top or cover 17 fits on to the top edges of the sides, and a handset 18 rests on the cover.

In the particular telephone set base illustrated, the dial is positioned between the recesses which receive the transmitter and receiver ends of the handset, the dial thus being beneath the handset when the handset is in position on the base. The dial assembly is mounted on the base by two mounting brackets 20 (only one of which is seen in FIG. 1) on the dial assembly and two support brackets 22 and 23 extending up from the bottom surface 11. Support bracket 22 is integral with the side 12, while support bracket 23 is positioned towards the center of the base.

Figure 2:
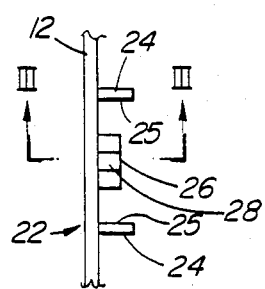
FIG. 2 is a plan view on one of the support brackets of the base.
Figure 4:
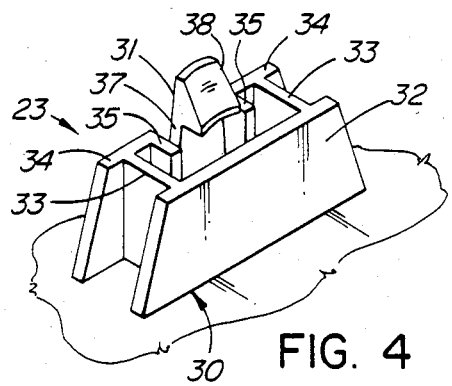
FIG. 4 is a perspective view of the other support bracket of the base.
Figure 3:
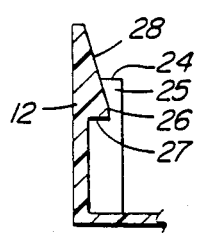
FIG. 3 is a cross-section on the line III—III of FIG. 2.
Figure 5:
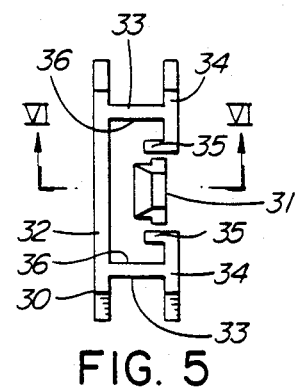
FIG. 5 is a plan view of the bracket of FIG. 4.

The bracket 22 is seen in more detail in FIGS. 2 and 3. The bracket comprises two spaced apart webs 24 extending inward normal to the side 12. The webs 24 provide opposed guide surfaces 25. Between the webs 24 is a latching member 26 having a downwardly facing latching surface 27. The latching member 26 extends inwardly from the side 12 and extending down from the top of the side 12 is a downwardly and inwardly inclined surface or ramp 28. The latching member 26, and latching surface 27, are arcuate, the surface 27 being concave.

The bracket 23 is seen in more detail in FIGS. 4, 5, 6 and 7. The bracket comprises a channel shaped member 30 with a separate latching member 31. The member 30 has a back flange 32 and two parallel spaced apart webs 33 extending forward from the back flange 32, toward the side 12 and bracket 22. At the inner edge of each web 33 is a narrow flange 34 extending sideways on each side of each web 33. At the opposed edges of the flanges 34 are ribs 35 extending towards the back flange 32. The opposed inner surfaces 36 of the webs 33 form guide surfaces. The latching member 31 is resiliently deformable in a direction away from the back flange 32. The member 31 comprises a thin web 37 with a projecting rib 38 at the top end, the rib having an arcuate, downward facing, latching surface 39, the surface 39 being concave. The rib 38 has a downward and inwardly inclined surface or ramp 40 extending to the latching surface 39.

Figure 8:
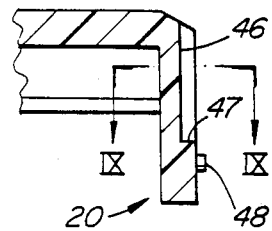
FIG. 8 is a cross-section through one of the mounting brackets on the dial assembly generally on the line VIII—VIII of FIG. 1.
Figure 6:
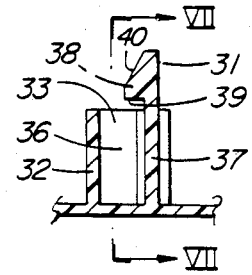
FIGS. 6 and 7 are cross-sections on the lines VI—VI and VII—VII respectively of FIG. 5.
Figure 9:
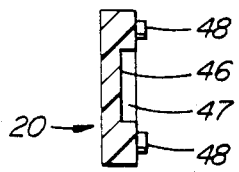
FIG. 9 is a cross-section on the line IX—IX of FIG. 8.
Figure 7:
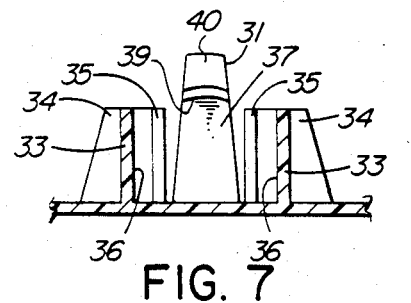
Figure 10:
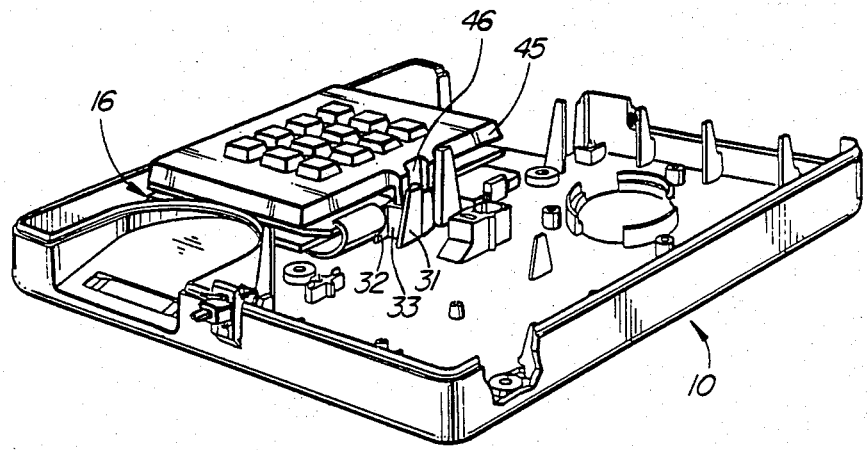
FIG. 10 is a perspective view of the dial assembly mounted on the base.

The mounting brackets 20 on the dial assembly are illustrated in more detail in FIGS. 8 and 9. In the example, the brackets 20 are formed on each side of the bezel member 45, which is the uppermost member of the dial assembly. The brackets extend downwards and are of a width that they will slide down between the guide surfaces 25 on bracket 22 and between guide surfaces 36 on bracket 23. In addition, a bracket 20 slides down between the inner edges of the ribs 35 and the front surface of the back flange 32 of bracket 23. Each bracket 20 has a recess in the form of a groove 46 extending part way down the bracket and having an arcuate bottom surface 47, the surfaces 47 being convex. The arcuate surfaces 47 are positioned so as to engage under the surfaces 27 and 39 on the brackets 22 and 23. On the outer surface of each bracket 20 are two small protrusions 48. The protrusions 48 on one bracket 20 slide down in channels formed by the ribs 35 and webs 33 in bracket 23 and are in contact with the flanges 34. On the other bracket 20 the protrusions 48 are in contact with the side 12 of the base.

The dial assembly is mounted on the base by initially lining up the mounting brackets 20 over support brackets 22 and 23. One side of each mounting bracket is pushed against a guide surface 25 and a guide surface 36 and the dial assembly pushed down. To ease initial alignment and interengagement of mounting brackets 20 with support brackets 22 and 23, the bottom edge of each mounting bracket 20 is chamfered, at 50. Thus one side of each bracket 20 can be aligned and initially inserted before the other side starts to insert.

The brackets 20 are moved down in contact with the ramps 28 and 40. This deflects or deforms the latch member 31 until the surfaces 47 on the brackets 20 are below the surfaces 27 and 39 when latch member 31 can snap back, pushing the surface 47 on one bracket 20 under the latching surface 27 on bracket 22, and the latching surface 39 moving over the surface 47 on the other bracket 20. At this time the bottom edges of the brackets 20 will be in contact with the bottom surface 11 of the base. The dial assembly is then held firmly in place. The dial has been positioned purely by vertical movement and no access to a side has been necessary to tighten holding fixtures.

To remove a dial assembly, a flat member, for example a screwdriver, is pushed down between the bottom of a recess 46 and the ramp 40 to deflect the latch member outward, releasing latching surface 39 from surface 47 on the related bracket 20. The dial assembly can be lifted at the one side slightly and then eased sideways, further deflecting latching member 31, and the brackets 20 and 22 disengaged and the dial then lifted up. Again removal is by vertical movement and access is only needed from the top. No side access is required to loosen fastening devices. It is therefore possible to mount the dial assembly up tight against a side of a base, as in FIG. 1. It is also possible to closely mount other components very close to the edges of the dial assembly. The vertical profile can be very low, corresponding to the height, or thickness of the dial assembly, if desired.

What is claimed is:

1. A mounting for a dial in a telephone set base, comprising;

two opposed spaced apart support brackets extending up from a bottom surface of the telephone set base, each support bracket including two guide formations spaced apart in a direction normal to the spacing of the support brckets, and a latch member positioned between the guide formations; each latch member including a latch surface spaced from said bottom surface, the latch surfaces projecting inwardly towards each other, and a downwardly and inwardly inclined surface leading to an inner edge of the latch surface; at least one of said latch members being resiliently deflectable; and two cooperating mounting brackets extending down one one each side of a dial assembly, each mounting bracket including guide formations for cooperating with the guide formations on saud support brackets and also a recess for reception of one of said latch surfaces, one of said support brackets being unitary with a side wall of said telephone set base, and the other of said support brackets comprising a channel shaped member having a back flange and two parallel spaced apart webs extending forward from said back flange towards said one support bracket, said spaced apart webs forming said guide formations.

2. A mounting as claimed in claim 1, including a flange extending sideways on each side of each of said spaced apart webs, and a rib extending rearwardly from the inner, opposed, edges of said flanges, said latching member positioned between said ribs and deflectable away from said back flange of said channel shaped member.

3. A mounting as claimed in claim 2, said latching member comprising an upwardly extending web and an inwardly projecting rib at the top end of the web, said inwardly projecting rib having a downwardly facing latch surface.

4. A mounting as claimed in claim 3, said downwardly facing latch surface being of concave arcuate form.

5. A mounting as claimed in claim 1, said one support bracket which is unitary with a side wall of said base comprising two spaced apart webs integral with and extending inwardly from said side wall, opposed walls of said spaced apart webs forming said guide formations, the latching member comprising a member extending inwardly from, and integral with said side wall, and having a downwardly facing latch surface.

6. A mounting as claimed in claim 5, said downwardly facing latch surface being of concave arcuate form.

7. A mounting as claimed in claim 1, said guide formations on each support bracket comprising opposed guide surfaces, said guide formations on each of said mounting brackets including oppositely facing guide surfaces spaced apart to slide between said guide surfaces on the support brackets.

8. A mounting as claimed in claim 7, including a groove extending down in an outer surface of each mounting bracket, each groove having a bottom surface spaced up from said bottom surface of said telephone set base, said grooves forming said recesses, the bottom surface of each groove positioned to engage beneath a latch surface of a cooperative support bracket.

9. A mounting as claimed in claim 8, the bottom surfaces of said grooves being of convex arcuate form.

10. A mounting as claimed in claim 7, including at least one protrusion on an outer surface of each mounting bracket, said protrusions engaging with said support brackets.

11. A telephone set comprising:
a dial assembly having a top surface;
a telephone set base having a bottom surface; and
a mounting for said dial assembly in said telephone set base, comprising:
two opposed spaced apart support brackets extending up from said bottom surface of the telephone set base, each support bracket including two guide formations spaced apart in a direction normal to the spacing of the support brackets, and a latch member positioned between the guide formations; each latch member extending upwardly from said bottom surface and including a latch surface spaced from said bottom surface, the latch surfaces projecting inwardly towards each other, and a downwardly and inwardly inclined surface leading to an inner edge of the latch surface; at least one of said latch members being resiliently deflectable;
two cooperating mounting brackets extending down one on each side of said dial assembly, each mounting bracket including guide formations for cooperating with the guide formations on said support brackets and also a recess having a recess surface for reception of and interengagement with one of said latch surfaces; and
means formed in said top surface to permit access to said resiliently deflectable latch member from above said dial assembly and to permit said resiliently deflectable latch member to be disengaged from said dial assembly, thereby permitting said dial assembly to be removed from said base from above said top surface.

12. A telephone set as claimed in claim 11, wherein one of said support brackets is unitary with a side wall of said telephone set base.

13. A telephone set as claimed in claim 11, wherein one of said support brackets comprises a channel shaped member having a back flange and two parallel spaced apart webs extending forward from said back flange, towards the other support bracket, said spaced apart webs forming said guide formations.

14. A telephone set as claimed in claim 11, including a cover member which fits on said telephone base and covers a portion of said dial assembly, and means for removably mounting said cover to said telephone base.

* * * * *